Aug. 25, 1964  R. J. CALONGNE ETAL  3,145,794
WEIGH TANK
Filed March 13, 1961  2 Sheets-Sheet 1
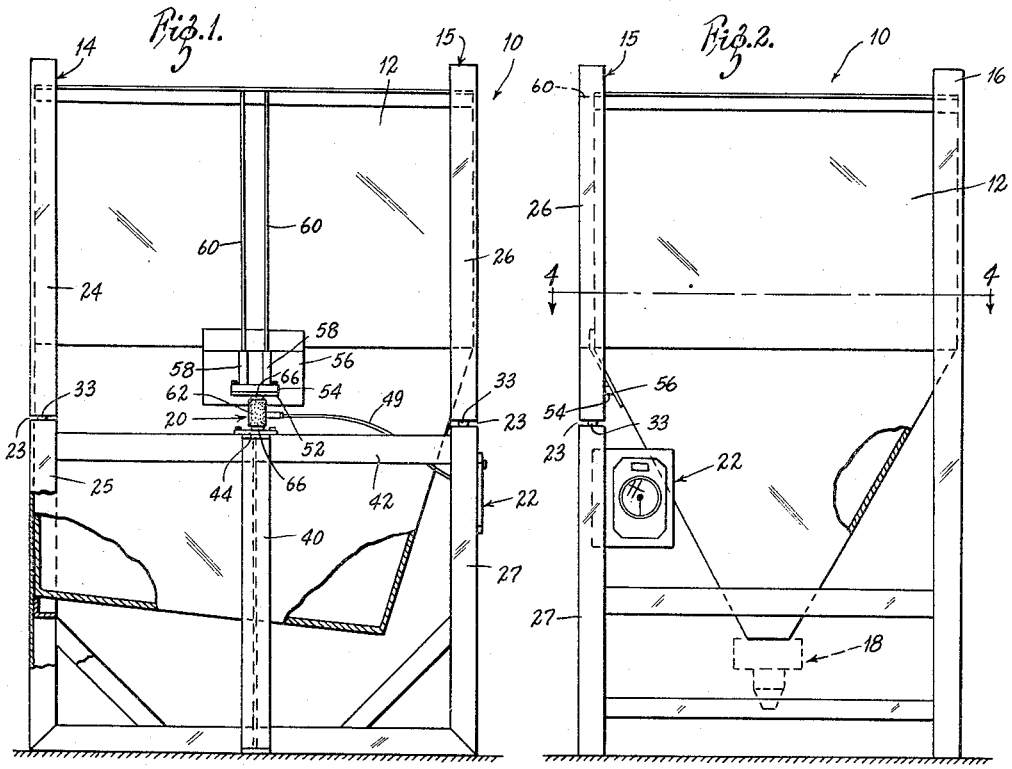
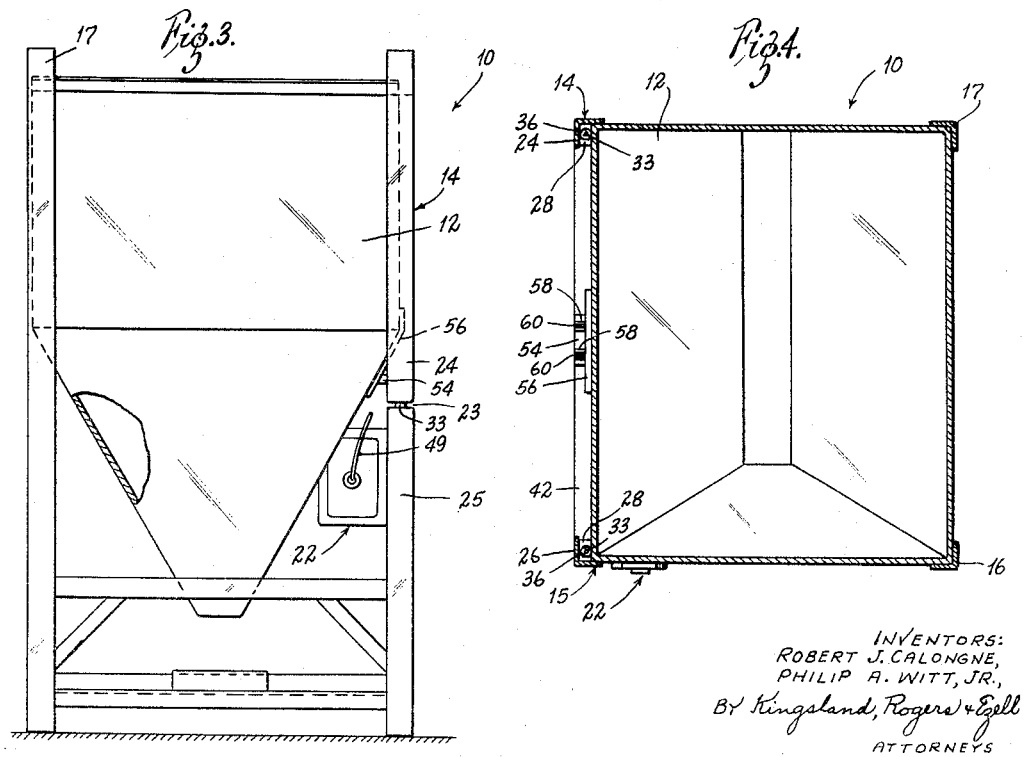
INVENTORS:
ROBERT J. CALONGNE,
PHILIP A. WITT, JR.,
BY Kingsland, Rogers & Ezell
ATTORNEYS Aug. 25, 1964  R. J. CALONGNE ETAL  3,145,794
WEIGH TANK
Filed March 13, 1961  2 Sheets-Sheet 2
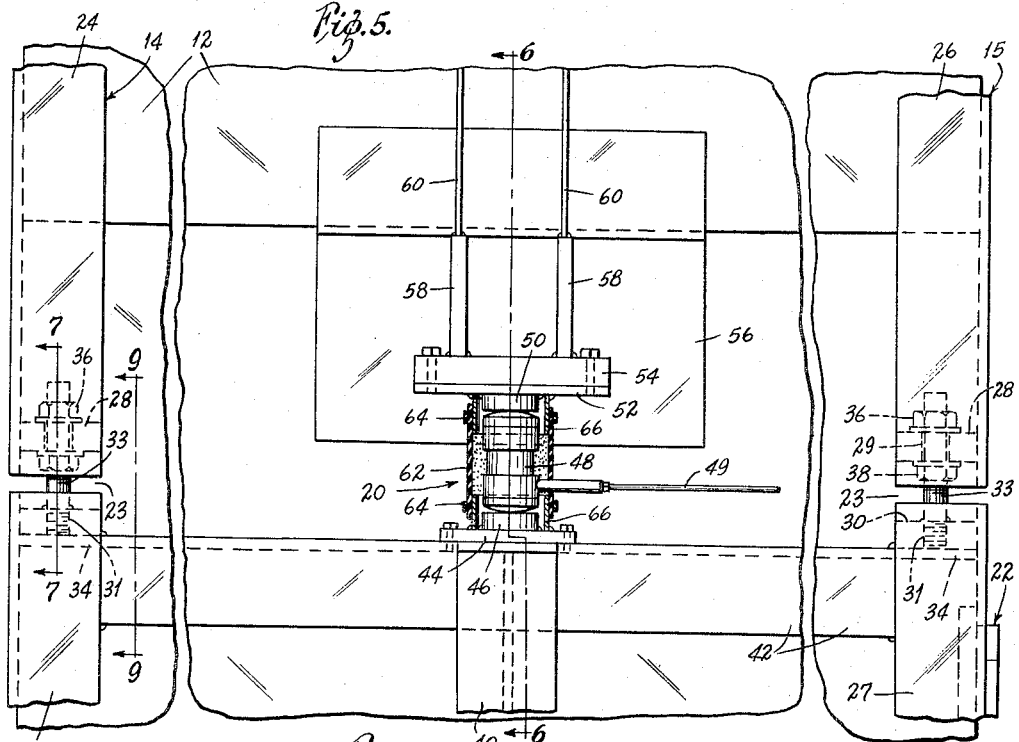
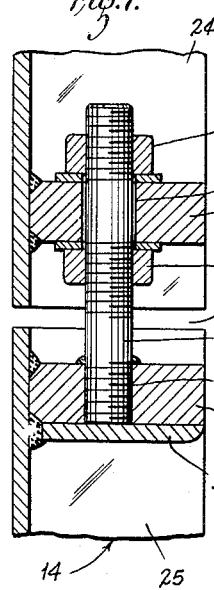
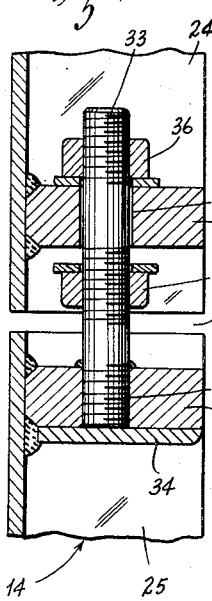
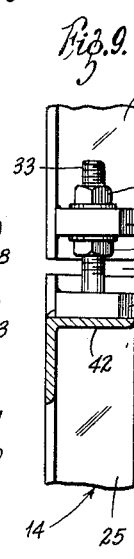
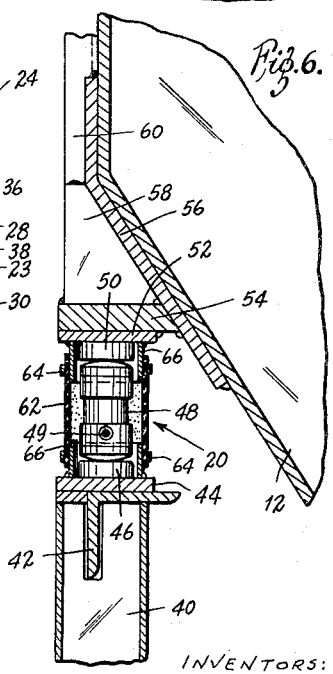
INVENTORS:
ROBERT J. CALONGNE
PHILIP A. WITT, JR.,
BY Kingsland, Rogers & Ezell
ATTORNEYS United States Patent Office 3,145,794
Patented Aug. 25, 1964

3,145,794
WEIGH TANK
Robert J. Calongne and Philip A. Witt, Jr., Houston, Tex., assignors to Milwhite Mud Sales Company, St. Louis, Mo., a corporation of Delaware
Filed Mar. 13, 1961, Ser. No. 95,197
5 Claims. (Cl. 177—208)

The present invention relates generally to weighing constructions, and more particularly to a novel construction and method by means of which the material in a tank may be weighed and the weight continuously indicated or recorded.

In the field of bulk materials, solid and liquid, there has long existed the problem of weighing the material at the point of use and maintaining a reasonably accurate indication or record thereof, which is particularly acute in respect to portable tanks for holding and delivering bulk material. Various devices have been employed to weigh the material in portable tanks, such as the disposition of load cells under each leg of the tank, but these are both clumsy and expensive. The whole tank and contents may be weighed on a large scale, but this also is expensive and often impractical. The problem has been especially acute in the handling of bulk mud at well site in the oil well drilling field, and many efforts have been made to provide a satisfactory solution, but without success insofar as the applicants are aware.

Therefore, an object of the present invention is to provide novel weighing construction and method for weighing material in portable tanks, which is a solution of the long existing problem noted above.

In brief, the present invention contemplates the use of the tank supports to effect weighing of the contents thereof. The tank includes a hopper and four supporting steel legs in a preferred practical embodiment of the present invention, the two legs on one side of the tank being cut at a point below the vertical walls of the hopper and a small predetermined section removed. This places an eccentric load on the opposite legs causing them to deflect in proportion to the applied load, hence, due to the inherent elasticity of steel, these legs function as frictionless hinges. A suitable load measuring device is mounted to determine the load, the result being recorded or indicated, as desired.

Therefore, another object is to provide a weigh tank incorporating structure for weighing the contents thereof, which continuously indicates or records the weight of the contained material.

Another object is to provide a novel weigh tank incorporating a weighing construction utilizing the inherent resiliency and deflection characteristics of the supporting legs in determining the weight of the contents of the tank.

Another object is to provide a novel method of weighing material in a tank, particularly of the portable type adapted to receive and dispense bulk material.

Another object is to provide a novel weigh tank of the portable type which incorporates weighing and recording structure, whereby the contents of the tank may be quickly determined at any point of use.

Another object is to provide a novel weigh tank which is reasonably accurate, inexpensive, low in maintenance cost, and automatic in operation.

The foregoing and other objects and advantages are apparent from the following description taken with the accompanying drawings, in which:

FIGURE 1 is a view of one side of a portable weigh tank adapted to contain bulk material, such as drilling mud, incorporating the present invention;

FIGURE 2 is a view of the tank of FIGURE 1 rotated ninety degrees clockwise;

FIGURE 3 is a view of the tank of FIGURE 1 rotated ninety degrees counterclockwise;

FIGURE 4 is a horizontal, cross-sectional view taken on substantially the line 4—4 of FIGURE 2;

FIGURE 5 is an enlarged view of the central portion of the side of the tank shown in FIGURE 1, portions being broken away for conservation of space, and the protective covering of the load measuring device being in cross section to illustrate the load element;

FIGURE 6 is a vertical, cross-sectional view taken on substantially the line 6—6 of FIGURE 5;

FIGURE 7 is a vertical, cross-sectional view taken on substantially the line 7—7 of FIGURE 5;

FIGURE 8 is a view similar to FIGURE 7 showing the lower lock nut backed off to free the leg for movement; and FIGURE 9 is a vertical, cross-sectional view taken on substantially the line 9—9 of FIGURE 5.

Referring to the drawings more particularly by reference numerals, 10 indicates generally a portable weigh tank incorporating the teachings of the present invention, which receives and discharges solid or liquid bulk material. Broadly, the weigh tank 10 includes a hopper 12, four supporting legs 14, 15, 16, and 17, a discharge unit 18, a force measuring unit 20, a recording instrument 22, and connecting elements.

As illustrated, each of the legs 14–17 comprises a heavy structural steel member of angle cross section, which are welded, bolted, or otherwise secured to the four corners of the hopper 12. From each of the legs 14 and 15, a segment of predetermined thickness is cut away, leaving a space 23. Thus, the leg 14 is divided into two leg segments 24 and 25, and the leg 15 into leg segments 26 and 27. Adjacent the lower end of each of the leg segments 24 and 26 is welded a lug 28 having a smooth opening 29 vertically therethrough. Adjacent the upper end of each of the leg segments 25 and 27 is welded a lug 30 having a threaded aperture 31 extending vertically therethrough in alignment with the aperture 29. A stub shaft 33 readily engages each threaded aperture 31 and is welded to the lug 30 to prevent accidental displacement. In addition, a guard plate 34 limits downward movement thereof. The stub shaft 33 extends through the smooth opening 29 in each instance in free relation therewith. A lock nut 36 engages the upper surface of the leg 28 to limit upward movement of the leg segment 24 in respect to the leg segment 25 and the leg segment 26 in respect to the leg segment 27. A second lock nut 38 is provided, which is rotated into engagement with the bottom of the lug 28 in each instance for shipment of the weigh tank 10 and for initial installation of the force load unit 20, as illustrated in FIGURE 7. In operative use of the weigh tank 10, the lock nut 38 is rotated to the position of FIGURE 8 to permit relative movement between the leg segments 24 and 25 and the leg segments 26 and 27.

Between the legs 14 and 15 is a heavy structural member 40, which extends to the supporting surface and may be of I cross section. Extending horizontally across the top of the structural member 40 is another structural member 42 of angle cross section (FIGS. 1, 5, 6), which is welded or otherwise secured at its ends to the lower leg segments 25 and 27.

A plate 44 is bolted to the top of the structural member 42 and supports a hardened steel block or bearing plate 46 welded thereto. Mounted on the block 46 is a standard telescopic spool-type force measuring load element 48 which includes a fluid tube 49. Above the element 48 is a second bearing plate 50, which is welded to a plate 52, which is, in turn, welded to a superposed block 54. The block 54 is welded to a plate 56, which is welded to the hopper 12, as is clear from FIGURES 5 and 6.

Stiffener blocks 58 are welded to the top of the block 54 and to the plate 56, and stiffener fins or strips 60 are welded to the upper ends of the block 58 and to the plate 56 and the hopper 12.

The load element 48 is surrounded by a flexible dust sleeve 62 which is secured by straps 64 on stub sleeves 66 welded to the plates 44 and 52.

Mounted on the leg segment 27 is the weight recorder 22 with which the tube 49 is operatively connected. Where it is desired to maintain a permanent record of the material handled by the weigh tank 10, the weight recorder 22 may comprise a conventional instrument made by Taylor Instrument Companies, or the like, which includes the usual replaceable paper disc rotated by a clock mechanism and marking arms which respond to the force applied to the load element 48. Where it is desired simply to indicate the amount of material in the weigh tank at any particular time, the recorder 22 takes the form of a simple dial and pointer, the pointer being actuated by the fluid in the tube 49 from the load element 48 to indicate the number of pounds in the weigh tank 10 at any particular time.

It is to be understood that the load element 48 and the recorder 22 are conventional instruments, such as those available at the Taylor Instrument Companies, Rochester, New York, or any other company making such devices, no claim per se being made to these devices. The element 48 and recorder 22 are calibrated to allow for the weight of the hopper 12 and to show or record weight.

The discharge unit 18 is of conventional construction and may be provided with electronic or pneumatic controller to permit automatic dispensing of material if desired.

It is clear from the foregoing that the weigh tank either continuously indicates the weight of the contained material or makes a permanent record thereof. Bulk material, solid or liquid, deposited in the weigh tank 10 causes a force to be exerted against the load element 48, thereby causing the weight recorder 22 to function to indicate or to show the amount of material in the weigh tank 10. Only a small movement of the weigh tank 10 about its solid supporting legs 16 and 17 is necessary to move the load element 48, the required range being substantially 0.0012–0.003 inch in a standard installation provided to date.

It is manifest that there has been provided a weigh tank for bulk material of the portable type which fulfills the objects and advantages sought therefor.

It is to be understood that the foregoing description and the accompanying drawings have been given by way of illustration and example. It is also to be understood that changes in form of the several parts, substitution of equivalent elements or steps, and rearrangement of parts or steps, which will be readily apparent to one skilled in the art are contemplated as within the scope of the present invention, which is limited only by the claims which follow.

What is claimed is:

1. In combination: a weighing receptacle; supporting leg means therefor, including a flexible vertical columnar leg; means mounting the weighing receptacle upon the leg means so that weight of the receptacle and contents is carried by the columnar leg above the bottom thereof and flexes the vertical columnar leg in amounts that are functions of the weight of the receptacle and contents; a gauge-actuating member located at a point spaced laterally from the leg and means rigidly connecting it to the upper part of the columnar leg, so that it moves with and magnifies the amount of flexing of the leg under load; and sensing means acted upon by the said member to gauge the amounts of its said movements under load.

2. In the combination of claim 1, the supporting leg means including the aforesaid vertical columnar leg and second leg means spaced therefrom, the second leg means having upper portions connected to the receptacle and lower portions extending below the upper portions to ground, the upper portions being normally spaced above the lower portions and urged into said spaced relationship by the resiliency of the columnar leg, but being depressible toward the lower portions by the weight of the receptacle and contents; and guide means holding the upper and lower portions together for such movements.

3. In the combination of claim 1, the guide means also incorporating means to limit the separation of the upper and lower portions.

4. In the combination of claim 1, the means for connecting the gauge-actuating member to the columnar leg, the receptacle being rigidly mounted upon the columnar leg so as to tilt when the columnar leg flexes.

5. In the combination of claim 2, the leg means including two columnar legs on one side of the receptacle and rigidly connected to it, and the second leg means comprising two legs on the opposite side of the receptacle, each having the upper and lower portions as recited in claim 2.

References Cited in the file of this patent

UNITED STATES PATENTS

| 826,771 | Edwards et al. | July 24, 1906 |
| 1,233,124 | Powers | July 10, 1917 |
| 1,359,586 | Flagg | Nov. 23, 1920 |
| 1,656,791 | Henderson | Jan. 17, 1928 |

FOREIGN PATENTS

| 1,073,220 | Germany | Jan. 14, 1960 |

OTHER REFERENCES

Emery Tank Weighing Systems Bulletin 581, The A. H. Emery Co., New Canaan, Conn., 1958.